(12) United States Patent
Pfeiffer et al.

(10) Patent No.: US 6,947,253 B2
(45) Date of Patent: Sep. 20, 2005

(54) METHOD FOR BALANCING A ROTATING ASSEMBLY USING ECCENTRIC RINGS

(75) Inventors: Michael W. Pfeiffer, Richfield, MN (US); David D. Koester, Chanhassen, MN (US); Eric D. Johnson, Minneapolis, MN (US); David F. Borning, Burnsville, MN (US); Kevin J. Spiczka, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/626,204

(22) Filed: Jul. 24, 2003

(65) Prior Publication Data

US 2004/0194291 A1 Oct. 7, 2004

Related U.S. Application Data

(62) Division of application No. 09/721,505, filed on Nov. 22, 2000, now Pat. No. 6,707,639.
(60) Provisional application No. 60/193,689, filed on Mar. 31, 2000.

(51) Int. Cl.[7] .............................................. G11B 17/02
(52) U.S. Cl. ...................... 360/99.08; 73/469; 73/470
(58) Field of Search ........................... 360/99.08, 99.06, 360/99.07, 98.07; 369/264; 73/461, 468, 469, 470; 29/729, 742, 759, 834, 835

(56) References Cited

U.S. PATENT DOCUMENTS

| 4,003,265 A | 1/1977 | Craig et al. ....................... 74/5 |
| 4,928,029 A | 5/1990 | Wright ......................... 29/596 |
| 5,042,824 A | 8/1991 | Gardner et al. ............. 277/399 |
| 5,101,306 A | 3/1992 | Johnson .................... 360/98.08 |
| 5,151,836 A | 9/1992 | Ichihara .................... 360/99.05 |
| 5,167,167 A | 12/1992 | Tiernan, Jr. et al. .......... 74/573 |
| 5,376,850 A | 12/1994 | Elsing et al. .................. 310/67 |
| 5,537,272 A | 7/1996 | Kazmierczak et al. ... 360/99.08 |
| 5,555,144 A | 9/1996 | Wood et al. ............. 360/98.08 |
| 5,621,588 A | 4/1997 | Williams et al. ......... 360/97.07 |
| 5,648,881 A | 7/1997 | Yokouchi ..................... 310/43 |
| 5,859,745 A | 1/1999 | Elsing et al. ............ 360/97.01 |
| 6,031,687 A | 2/2000 | Konno et al. ............ 360/99.04 |
| 6,213,717 B1 | 4/2001 | Bucher et al. .............. 416/145 |
| 6,356,409 B1 | 3/2002 | Price et al. ............. 360/98.07 |
| 6,369,981 B2 | 4/2002 | Nii et al. ................. 360/99.08 |

*Primary Examiner*—Robert S. Tupper
(74) *Attorney, Agent, or Firm*—Westman, Champlin & Kelly, P.A.

(57) ABSTRACT

A method for balancing a spindle assembly for compensating for dynamic imbalance of the spindle assembly. The method uses a plurality of adjustable eccentric rings for dynamically balancing the spindle assembly. The plurality of eccentric rings are preassembled with the spindle assembly and the method includes the steps of measuring an imbalance of a combination of the spindle assembly and the eccentric rings preassembled with the spindle assembly and balancing the spindle assembly by adjusting the eccentric rings based upon a measured imbalance of the combination of the spindle assembly and the eccentric rings.

12 Claims, 14 Drawing Sheets

US 6,947,253 B2

METHOD FOR BALANCING A ROTATING ASSEMBLY USING ECCENTRIC RINGS

CROSS-REFERENCE TO RELATED APPLICATION

This application is a divisional application of U.S. application Ser. No. 09/721,505, filed Nov. 22, 2000 and claims priority to Provisional Application Ser. No. 60/193,689 filed Mar. 31, 2000 and entitled "BALANCING METHOD FOR DISC DRIVE AND MOTOR ASSEMBLY".

FIELD OF THE INVENTION

The present invention relates to a balancing system having application for a data storage device. In particular, the present invention relates to a balancing system for a spindle motor of a data storage device.

BACKGROUND OF THE INVENTION

Data storage systems are known which include a plurality of heads adapted to read or write data to a plurality of discs of a disc stack. The plurality of discs or disc stack are supported for co-rotation on a spindle assembly. The spindle assembly includes a spindle hub rotatable about a spindle shaft. The disc stack is supported on the spindle hub to rotate about the spindle shaft for operation via operation of a spindle motor as is known.

Heads are supported relative to the rotating discs to read or write data to the rotating discs. Accurate placement of the head relative to the disc surface is important for seek commands and track following for read-write operations. Various factors affect placement of the heads relative to the disc surface. For example, dynamic imbalance of the spindle assembly can affect track seek and following. Variations in the mass distribution of the spindle hub can affect dynamic balance of the spindle assembly. The present invention addresses these and other problems and provides advantages and solutions not previously recognized.

SUMMARY OF THE INVENTION

The present invention relates to a balancing system assembled with a spindle assembly for compensating for dynamic imbalance of the spindle assembly. The spindle assembly includes a rotor rotatable about a shaft. The rotor includes a plurality of radially concentric channels supporting adjustable eccentric rings for dynamically balancing the spindle assembly. The spindle assembly is balanced by adjusting the balance of eccentric rings assembled with the spindle assembly based upon a measured balance of the spindle assembly and the eccentric rings.

DETAILED DESCRIPTION OF ILLUSTRATIVE EMBODIMENTS

Figure 1:
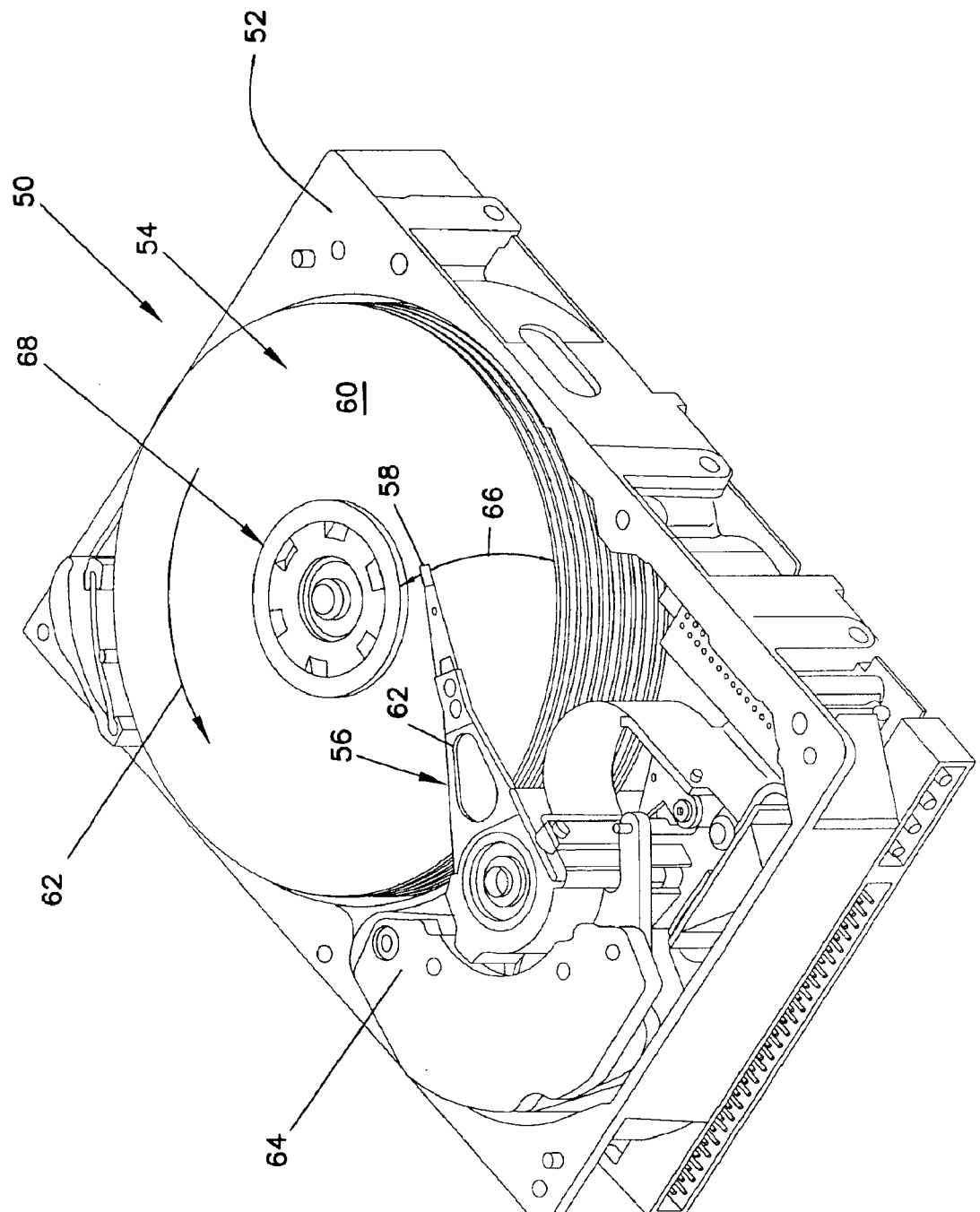
FIG. 1 is a perspective illustration of an embodiment of a data storage device or disc drive.
Figure 2:
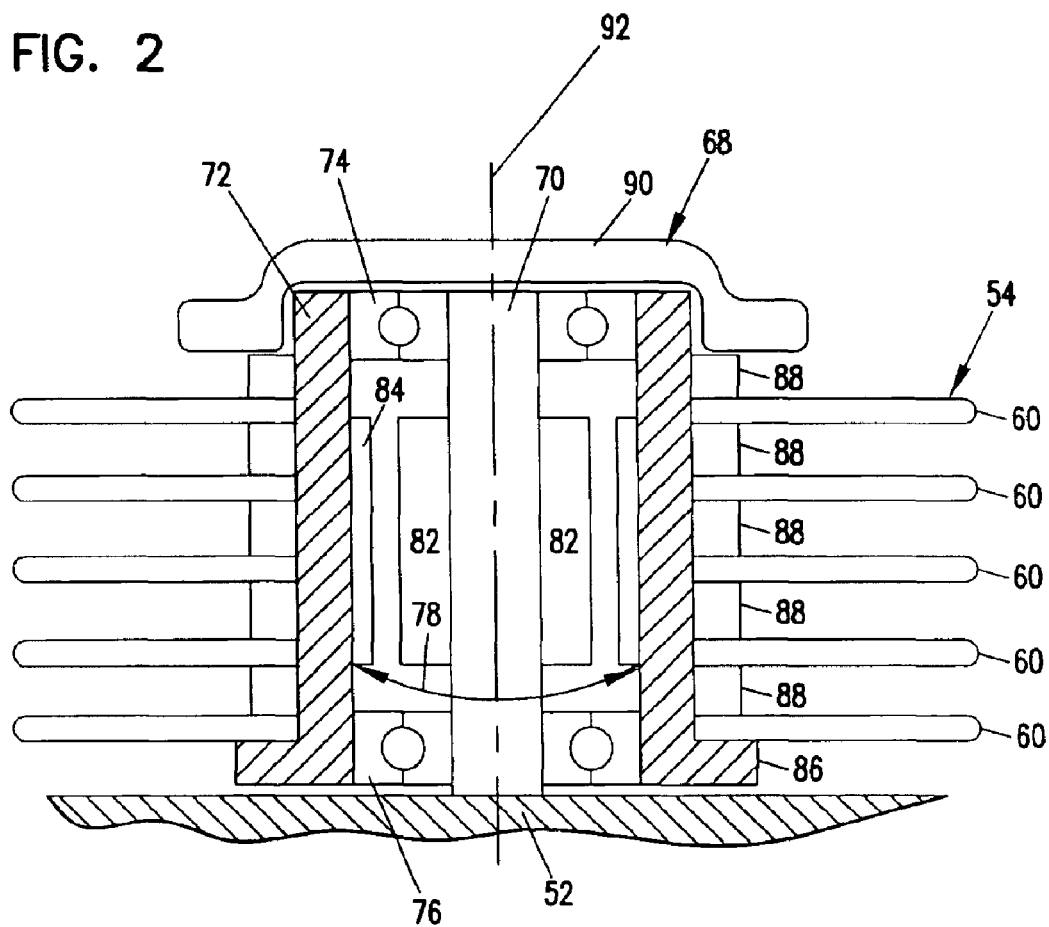
FIG. 2 is a cross-sectional view of a spindle assembly supporting a disc stack.

FIG. 1 is a schematic illustration of a data storage device 50 for storing digital information or data. As shown device 50 includes a chassis 52, a disc stack 54 and an actuator block 56 supporting a plurality of heads 58 (only one head shown in FIG. 1). Disc stack 54 includes a plurality of discs 60 and for operation is rotated as illustrated by arrow 62. A voice coil motor 64 moves actuator block 56 as illustrated by arrow 66 to position heads 58 relative to selected data tracks on discs 60 of the disc stack 54 for read or write operations Discs 60 of the disc stack 54 are supported on a spindle assembly 68 for co-rotation. As shown, in FIG. 2, spindle assembly 68 includes a spindle shaft or stationary spindle portion 70 and a spindle hub or spindle 72 rotationally coupled to spindle shaft 70 via bearings 74, 76. Spindle shaft is fixedly coupled to deck 52 and spindle hub 72 rotates about spindle shaft 70 as illustrated by arrow 78 via operation of a spindle motor. Spindle motor includes an energizable electromagnet 82 (illustrated diagrammatically) coupled to the spindle shaft 70 and a permanent magnet 84 coupled to the spindle hub 72. As shown the plurality of discs 60 are stacked on flange 86 of hub 74 and are separated by spacers 88 to form the disc stack 54. The discs 60 are clamped on hub 72 via clamp 90. Spindle hub 72 and clamp 90 rotate about shaft 70 to form the rotor of the spindle assembly.

For desired operation, the weight distribution of the spindle assembly should be dynamically balanced about a rotation axis 92 of the spindle assembly for proper head disc alignment. However, manufacture and assembly tolerance variations can introduce an unbalanced mass distribution about the rotation axis 92. Variations in the mass distribution can cause the spindle assembly to be dynamically imbalanced which can interfere with track seeking and following.

Figure 3:
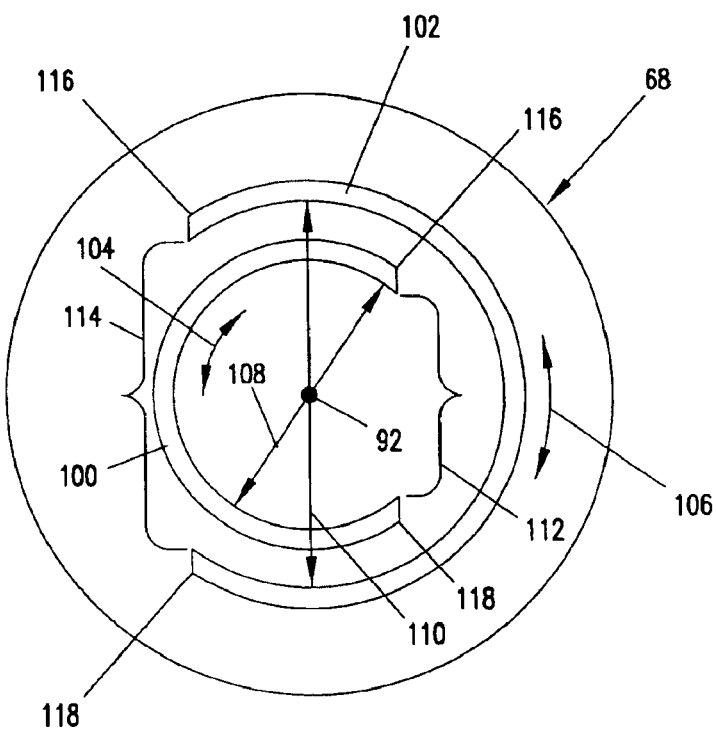
FIG. 3 is a schematic illustration of an embodiment of eccentric rings in a dynamically balanced position.

The present invention provides a balancing system to dynamically balance the spindle assembly. As schematically illustrated in FIG. 3, the balancing system of the present invention employs cooperating mass eccentric balance rings 100, 102 to balance the spindle assembly. The rings 100, 102 are coupled to the rotor of the spindle assembly 68 as illustrated diagrammatically and are cooperatively sized so that the rings 100, 102 have a dynamically balanced position about the rotation axis 92 as illustrated in FIG. 3.

The position of the mass eccentric rings is adjustable about spindle or rotation axis 92 as illustrated by arrows 104, 106 to adjust the mass distribution of the eccentric rings relative to axis 92. Rings 100, 102 are adjusted as illustrated by arrows 104, 106 from the dynamically balanced position shown in FIG. 3 to an imbalanced position shown in FIG. 4 to compensate for dynamic imbalance of the spindle assembly as will be explained.

As shown in FIG. 3, ring 100 has a first diameter dimension 108 and ring 102 has a second diameter dimension 110 larger than the first diameter dimension of ring 100. As shown, ring 100, 102 nest in radial concentric alignment to form inner and outer rings. The nested arrangement of rings 100, 102 limits the height requirement of the balance assembly (e.g. eccentric rings 100, 102) and allows for easy single point access for balancing the spindle assembly as will be described. The eccentric rings 100, 102 are sized so that the nested rings 100, 102 are dynamically balanced in the position shown in FIG. 3 based upon:

$$\int Mr_{100} * r_{100} = \int Mr_{102} * r_{102};$$

where
$Mr_{100}$ is the eccentric ring mass of ring 100 relative to the rotation axis 92;
$r_{100}$ is the radius of the center of mass of the ring 100 from the rotation axis 92;
$Mr_{102}$ is the eccentric ring mass of ring 102 relative to the rotation axis 92; and
$r_{102}$ is the radius of the center of mass of ring 102 from the rotation axis 92.

Figure 4:
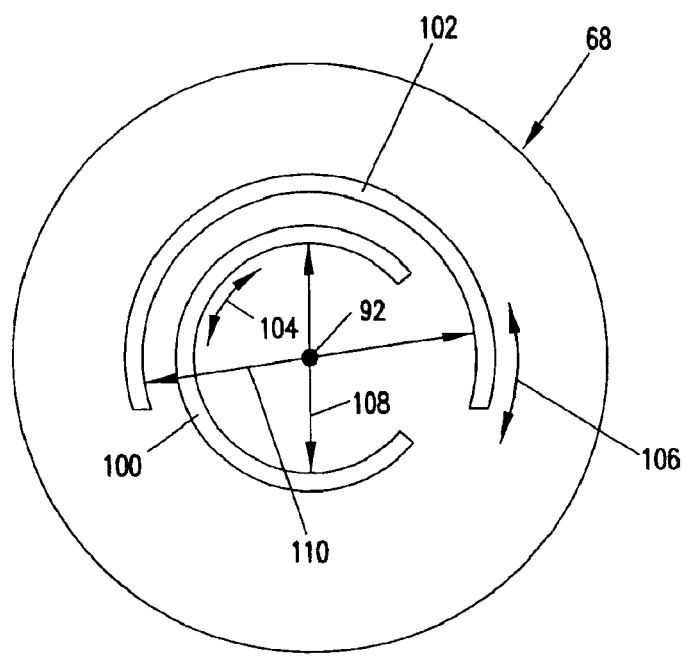
FIG. 4 is a schematic illustration similar to FIG. 3 with the eccentric rings adjusted for balancing of a spindle assembly.

The position of rings 100, 102 is adjusted as illustrated in FIG. 4 to adjust eccentric mass distribution of $Mr_{100} * r_{100}$ and $Mr_{102} \, r_{102}$ about axis 92 to balance the spindle assembly.

In the embodiment shown in FIGS. 3–4, rings 100, 102 are generally "C" shaped rings having a constant mass portion formed by the "C" shaped portion and a reduced mass portion formed by gaps 1112, 114 between opposed ends 116, 118 of the "C" shaped portion to provide an eccentric mass about axis 92. The dimension of gaps 112, 114 of rings 100, 102, respectively, having nested diameter dimensions $d_{100} < d_{102}$ where $d_{100}$ is the diameter 108 of ring 100 and $d_{102}$ is the diameter 110 of ring 102, are sized so that $gap_{114} < gap_{112}$ so that rings are dynamically balanced when the $gaps_{112,114}$ are orientated 180 degrees out of phase as shown in FIG. 3. Although the FIGS. illustrate a particular embodiment of a nested eccentric ring arrangement, application is not limited to the embodiment shown and alternate nested mass eccentric ring arrangements can be incorporated.

Figure 5:
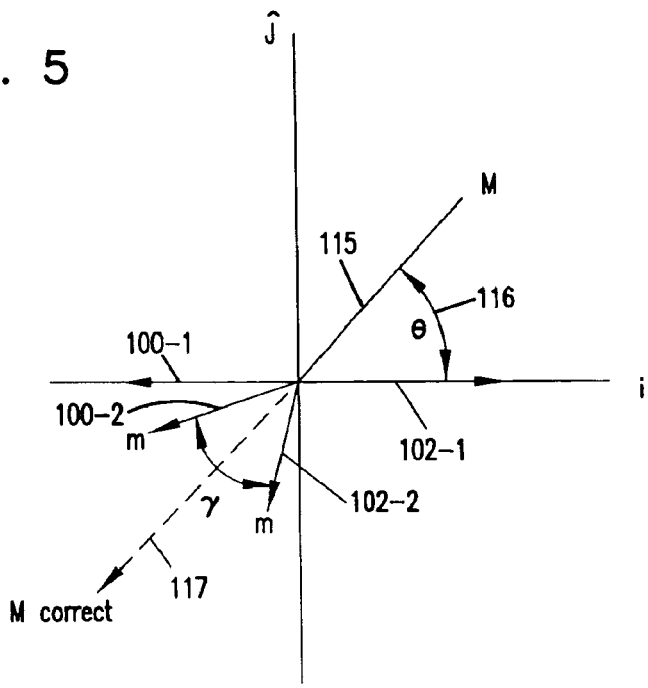
FIG. 5 is a vector illustration of eccentric rings for compensating for dynamic imbalance

FIG. 5 is a vector illustration of a spindle mass imbalance and eccentric ring mass distribution. As shown, the assembly include a mass imbalance as illustrated by vector 115 having a magnitude M and direction or angle θ 116. Rings 100, 102 are adjusted to provide a counterbalance of similar mass in the opposed direction as illustrated by vector 117. The magnitude m and direction of the center of mass of rings is illustrated by ring vectors 100-1, 102-1. Vectors 100-1, 102-1 illustrate dynamically balanced ring vectors orientated 180 degrees out of phase so that rings are dynamically balanced and have a net unbalance of zero. The position of rings is adjusted to an imbalanced position illustrated by ring vectors 100-2, 102-2 to provide a ring imbalance counter to the mass imbalance of the assembly. The magnitude of the imbalance of the rings 100, 102 is determined based upon a resultant of vectors 100-2, 102-2 as follows:

$$\cos(\gamma/2) = M/2\,m \text{ or } \gamma = \cos^{-1}(M/2\,m)*2$$

where:
M is the magnitude of the mass imbalance of the spindle assembly;
m is the magnitude of the mass of the eccentric rings 100, 102;
γ is the angle between the mass vectors 100-2, 102-2 of the eccentric rings 100, 102.

The orientation of the rings is determined based upon:

$$\text{Ring } 100 = \theta(116) + 180 \text{ degrees} - \gamma/2$$

$$\text{Ring } 102 = \theta(116) + 180 \text{ degrees} + \gamma/2$$

where θ is the angle of the spindle imbalance vector.

Figure 6:
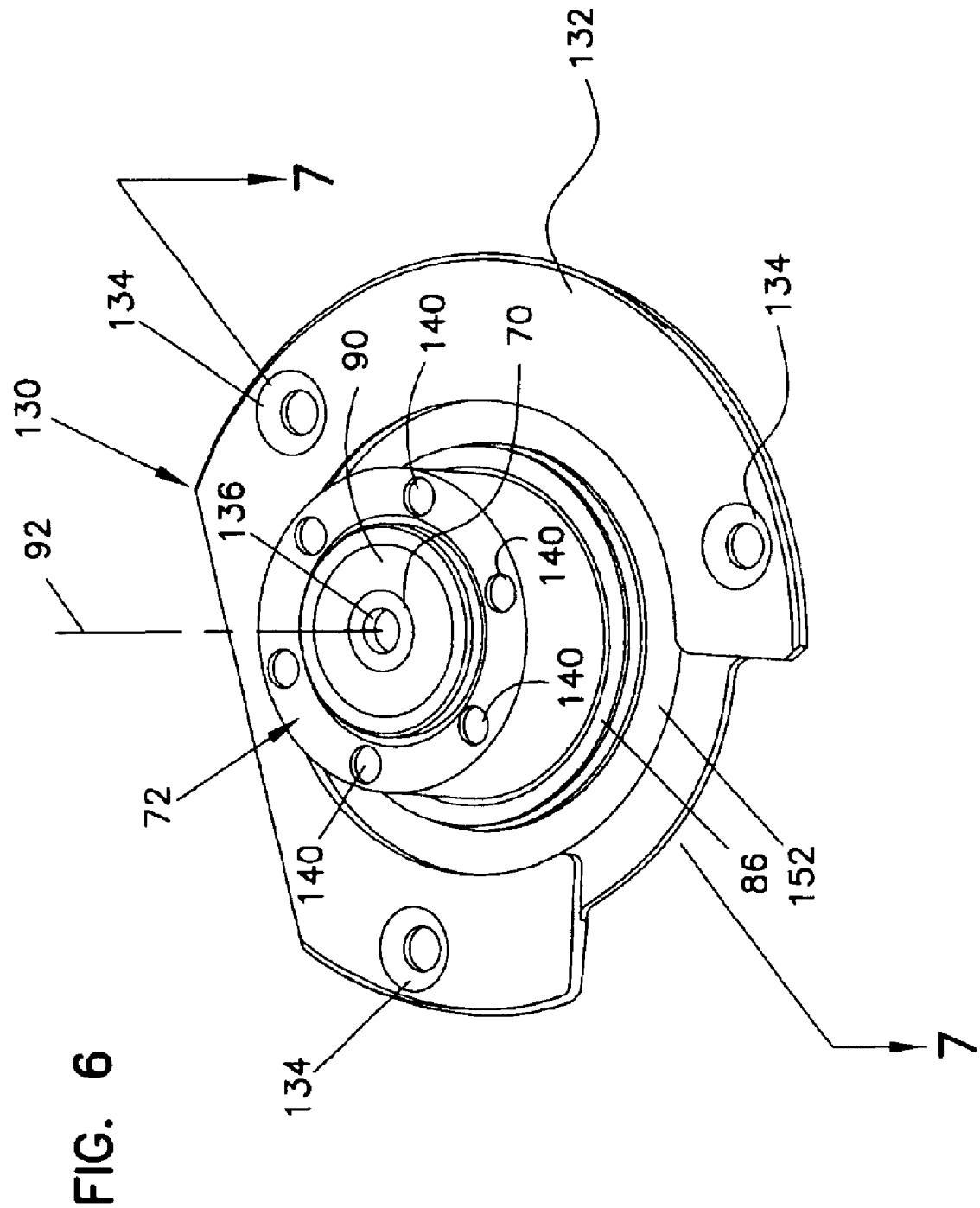
FIG. 6 is a perspective illustration of an embodiment of a spindle assembly shown seated in a mounting plate which is connectable to a chassis of a disc drive.
Figure 7:
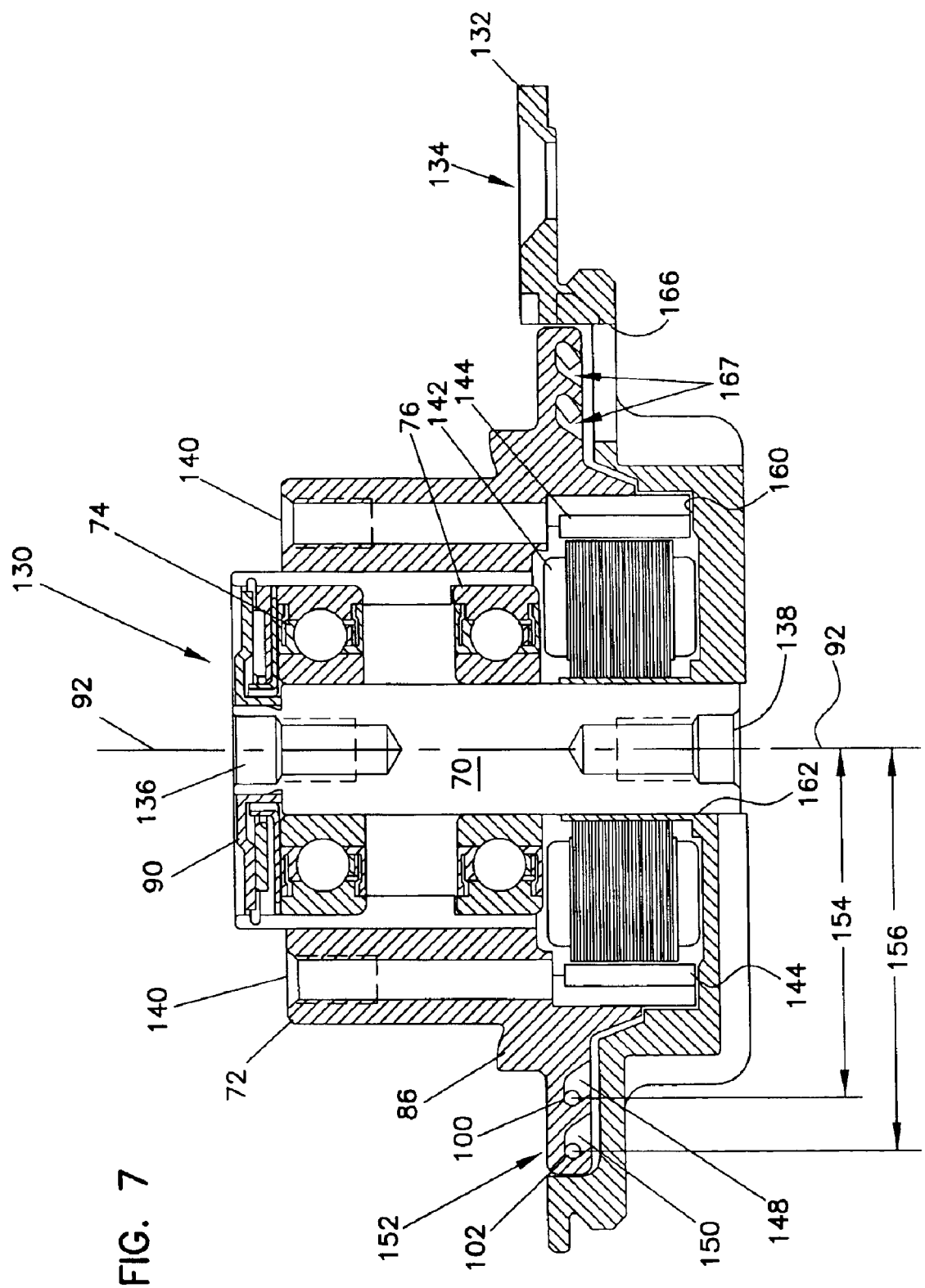
FIG. 7 is a cross-sectional view taken along lines 7—7 of FIG. 6.
Figure 8:
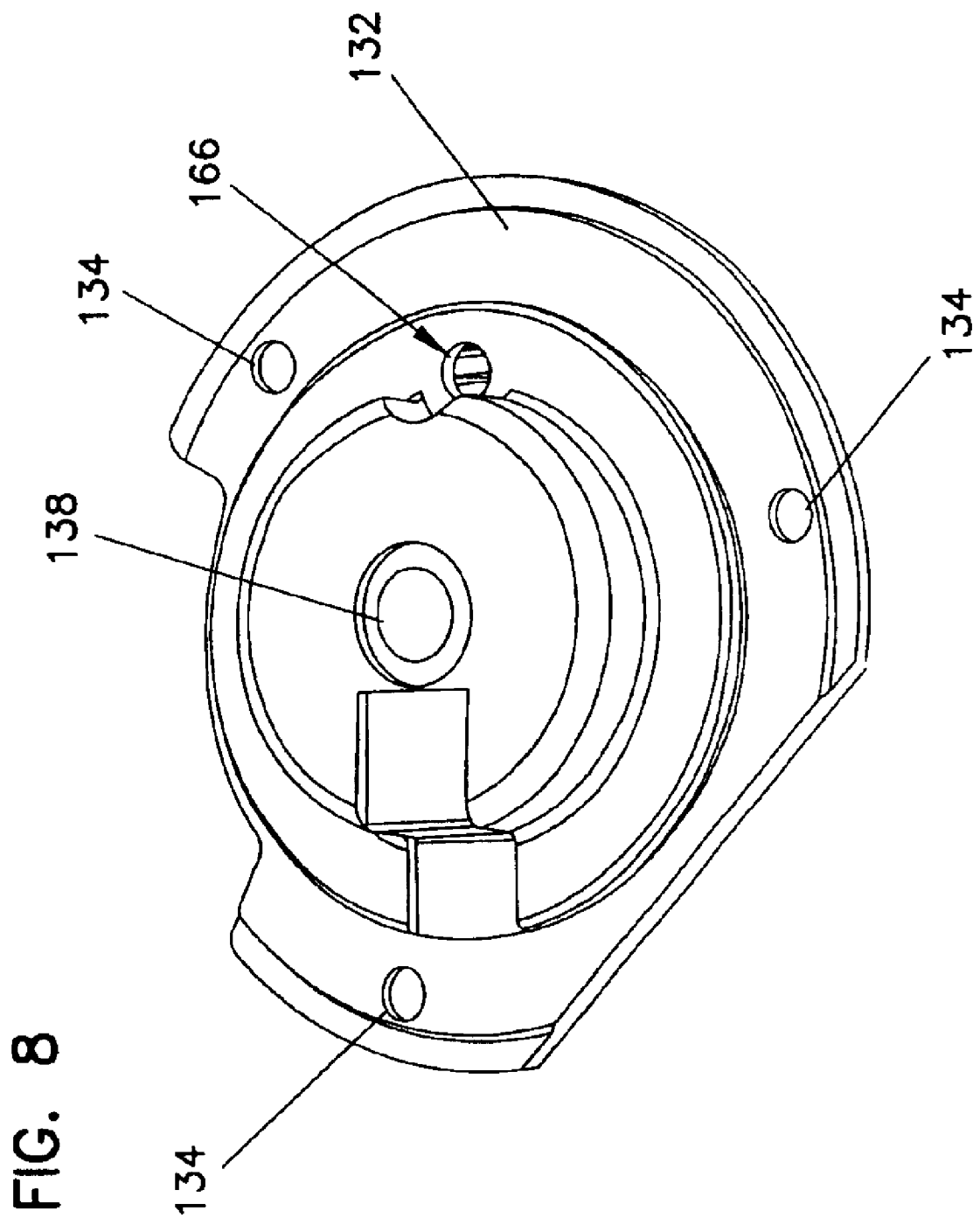
FIG. 8 is a perspective illustration of a bottom portion of the embodiment of FIG. 6.

FIGS. 6–7 illustrate an embodiment of a spindle assembly 130 including eccentric rings for balancing the spindle assembly as previously described where like numbers are used to identify like parts in the previous FIGS. The spindle assembly shown in FIG. 6 is connected to mounting plate 132 to secure the spindle assembly to the chassis or deck 52 of a disc drive through fastener holes 134 in mounting plate 132. As shown, shaft 70 includes threaded countersunk bores 136, 138 on opposed ends as cooperatively illustrated in FIG. 7. Rotating hub 72 includes a plurality of threaded countersunk bores 140 spaced upon the circumference of the spindle hub 72. Spindle hub 72 rotates about spindle shaft 70 as previously explained by an electric motor including an energizable electromagnet 142 on shaft 70 and a permanent magnet 144 on spindle hub 72 as shown in FIG. 7 to rotate the supported disc stack for operation In the embodiment illustrated, eccentric rings 100, 102 are adjustably supported in concentric channels 148, 150 formed in an integral rim portion 152 on the spindle hub 72. Integral rim portion 152 is formed at a base of the spindle hub 72 and channels 148, 150 on rim portion 152 are sized to allow adjustment of the rings via an applied adjustment force and to limit movement of the rings in channel absent an applied force. Channels 148, 150 are spaced from axis 92 a distance 154, 156, respectively, to concentrically house rings 100, 102 in a nested arrangement as described in the previous embodiment.

Although FIG. 7 illustrates eccentric rings 100, 102 for a single plane balance on a bottom rim portion 152, the invention is not limited to a single plane balance on the rim portion shown in FIG. 7. The assembly can include a two-plane dynamic balance system having multiple axially spaced balancing assemblies including rings 100,102. For example, the assembly can include lower rings 100, 102 formed on a lower portion of the spindle or rotor and upper rings 100, 102 formed on an upper portion of the spindle or rotor and spaced from the lower rings 100, 102. In one embodiment, upper rings 100, 102 can be incorporated into the spindle cap 90.

Rings 100, 102 are assembled in channels 148, 150 and the spindle assembly 130 including the assembled rings 100, 102 is seated into a well 160 of mounting plate 132. As shown, mounting plate 136 includes a shaft opening 162 for spindle shaft 70. Mounting plate 132 and spindle assembly 130 are connected to the drive chassis 52 through fastener holes 134 on the mounting plate 132. In the embodiment shown, shaft 70 is fixed to a cover (not shown) by a threaded fastener in hole 136. Mounting plate 132 includes an access opening 166 opened to channels 148, 150 to adjust rings 100, 102 for dynamic balancing.

Figure 9:
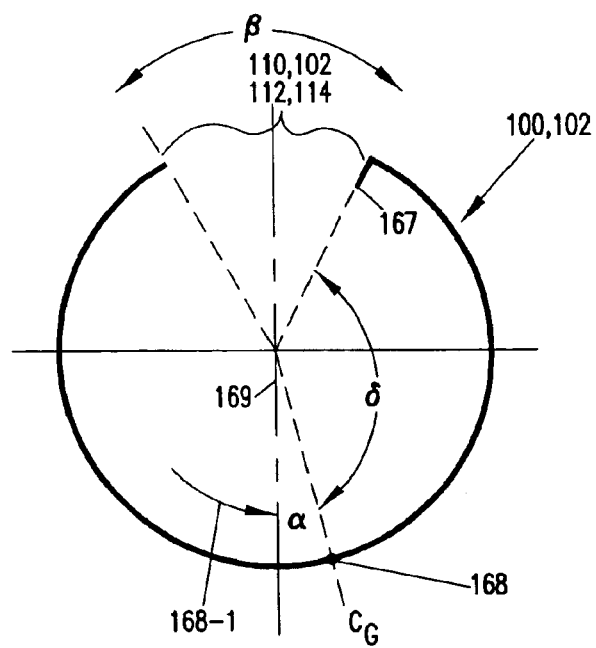
FIG. 9 is an illustration of a "C" shaped ring including a tab.

In the embodiment shown, rings 100, 102 include a tab 167. The position of rings 100, 102 is adjusted (or rotated) via a probe (not shown) which extends through access opening 166 and engages tabs 167 to rotate the rings 100, 102 to balance the spindle assembly as previously explained. In the embodiment shown, ring tabs 167 are formed by bending a "free end" of a "C" shaped ring toward the access opening 166. FIG. 9 is a schematic illustration of the mass distribution of "C" shaped rings including tab 167. As shown, the tab 167 shifts the center of gravity 168 of the rings 100, 102 an angle $\alpha$ 168-1 from the center axis 169 of the ring. In the illustrated embodiment, ring position is calculated as follows to compensate for the mass of tab 167.

Ring $100=\theta(116)+180$ degrees$-\gamma/2+\beta_{100}/2$dont understand$-\alpha_{100}$ Ring $102=\theta(116)+180$ degrees$+\gamma/2+\beta_{102}/2-\alpha_{102}$ where:

$\beta_{100, 102}$ is the angle of the gap of rings 100, 102 as illustrated in FIG. 9; and $\alpha_{100, 102}$ is the angle 168-1 of the center of gravity of rings 100, 102 from the center axis 169 as shown in FIG. 9

Figure 10:
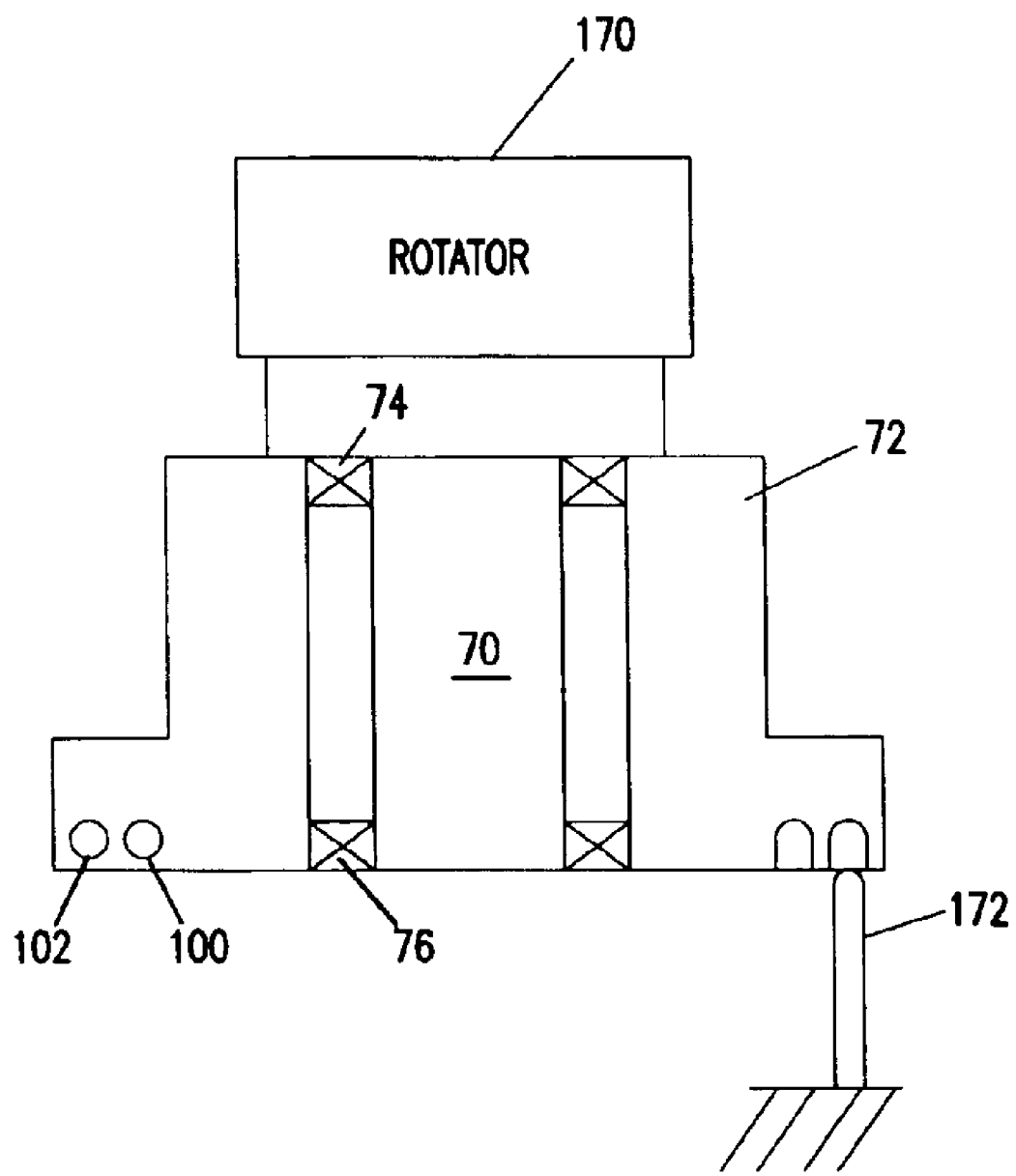
FIG. 10 is a schematic illustration of an embodiment of an assembly for adjusting eccentric rings for dynamically balancing a spindle assembly shown schematically.

In the device shown, the imbalance of the spindle assembly is measured with the rings preassembled in the spindle assembly in the dynamically balanced position. This provides advantages and flexibility over prior systems where the spindle is balanced prior to completion of the spindle assembly. A balancing device as schematically illustrated in FIG. 10, automatically adjusts the position of the rings 100, 102 based upon the measured imbalance via a rotator 170 which rotates the spindle hub or rotor 72 relative to the spindle shaft 70 while a probe 172 illustrated schematically engages the rings 100, 102 to limit movement of rings 100, 102 so that the position of the rings is adjusted via rotation of the spindle hub 72.

Figure 11:
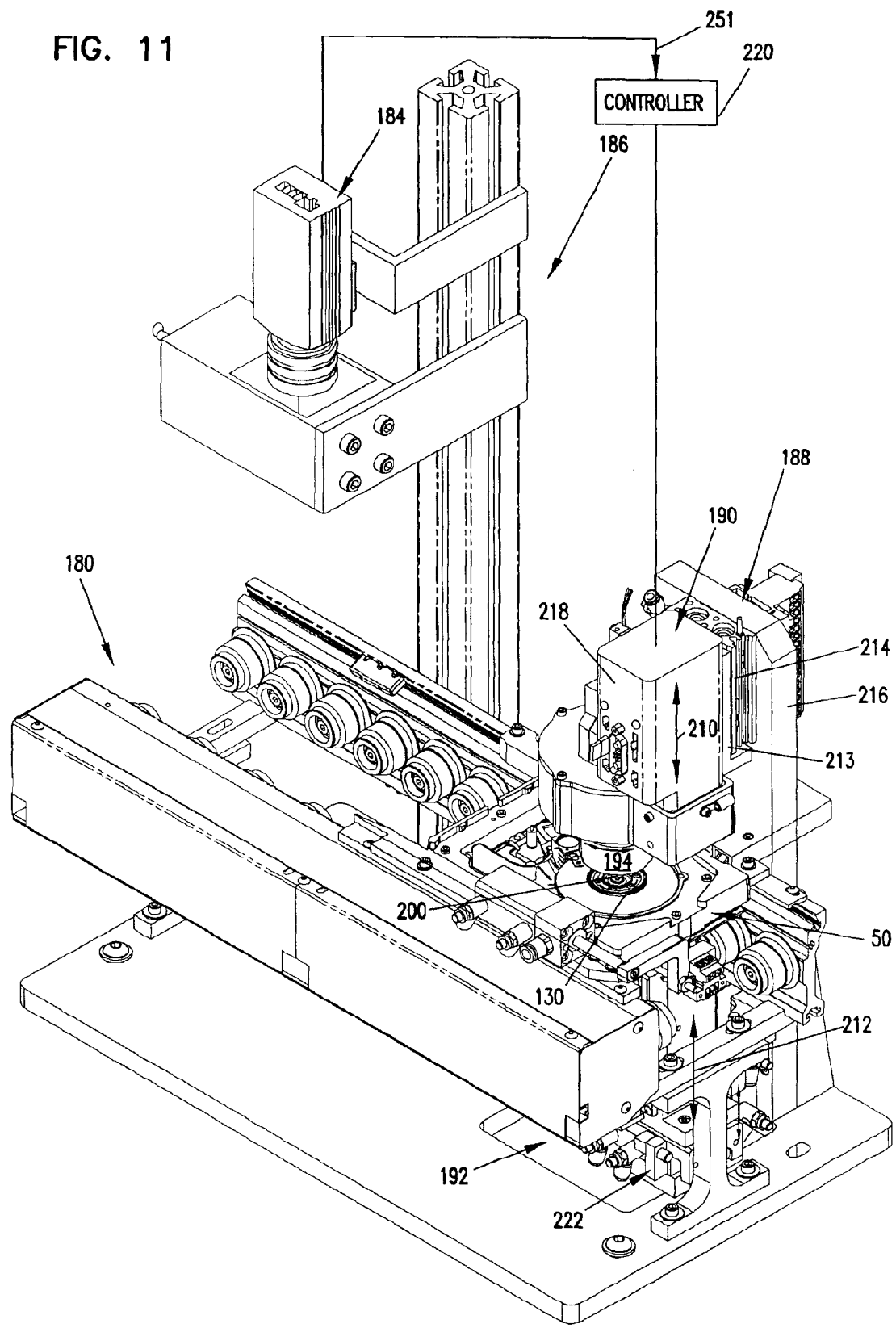
FIG. 11 is a perspective illustration of an embodiment of a balancing assembly supported along a conveyor for balancing spindle assemblies of disc drives advanced along the conveyor.

As shown in FIG. 11, rings 100, 102 can be adjusted as the disc drive (with an assembled spindle) is conveyed along an assembly conveyor 180. Prior to balancing operations, the alignment of the spindle assembly is measured by a sensor 184 at a sensor station 186. In the illustrated embodiment, sensor 184 includes a camera which measures alignment of holes 140 on hub 72 for alignment of the hub rotator mechanism 170 as will be described. After alignment is measured, the disc drive is advanced from the sensor station 186 to a balancing station 188.

Figure 12:
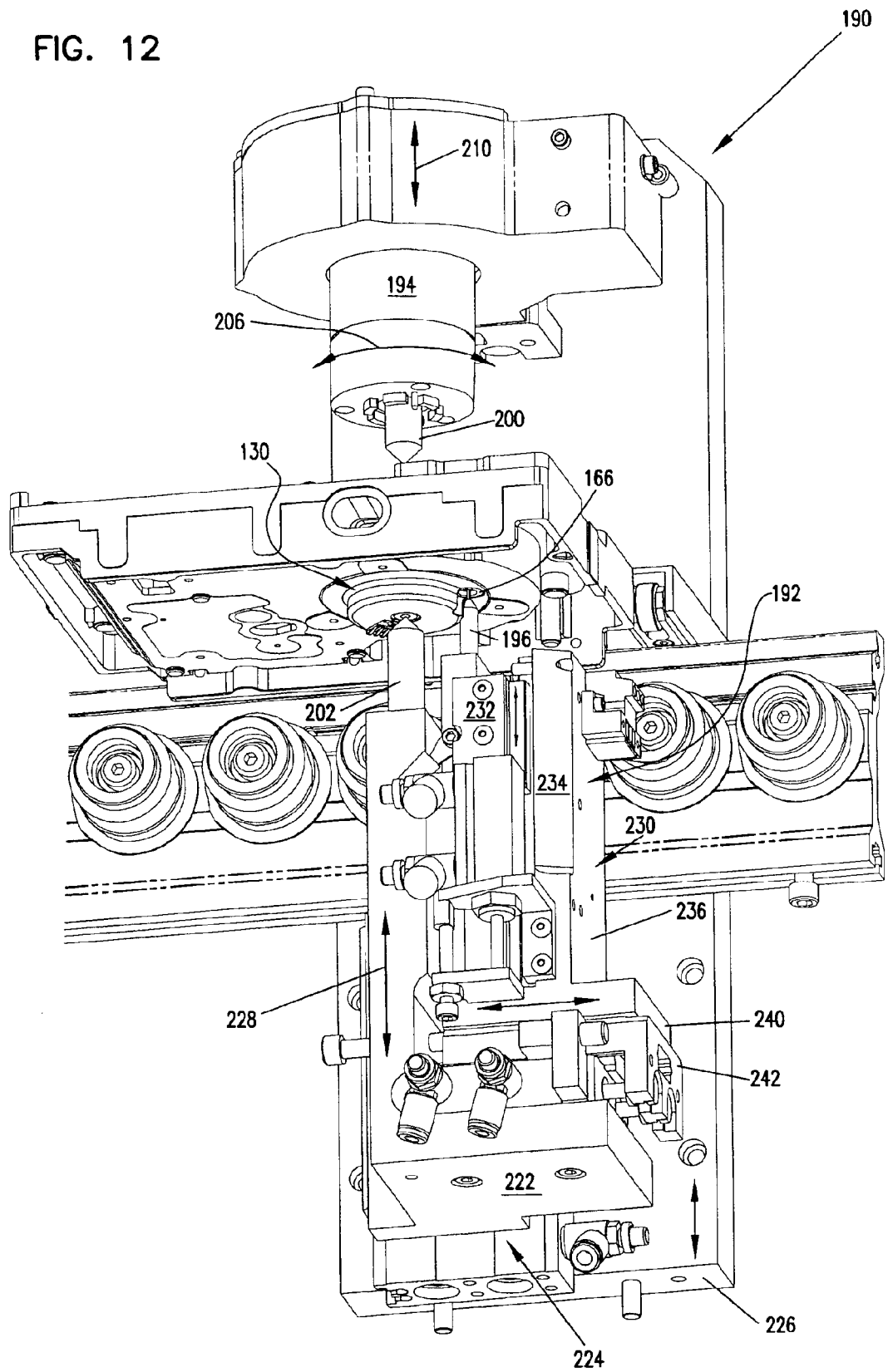
FIG. 12 is a detailed perspective illustration of balancing units supporting a head and a probe for adjusting eccentric rings for dynamically balancing a spindle assembly.

Balancing station 188 includes balancing units 190, 192 supported in opposed upper and lower relation. Balancing unit 190 include a rotating head 194 forming rotator 170 and balancing unit 192 includes ring probe 196 shown in FIG. 12 which extends through access opening 166 to contact rings 100, 102. As shown in FIGS. 11–12 for balancing operations, spindle assembly 130 is supported between upper and lower spindle pins 200, 202 coupled to upper and lower balancing units 190, 192. Spindle pins 200, 202 extend into opposed spindle bores 136, 138 shown in FIG. 7.

Figure 13:
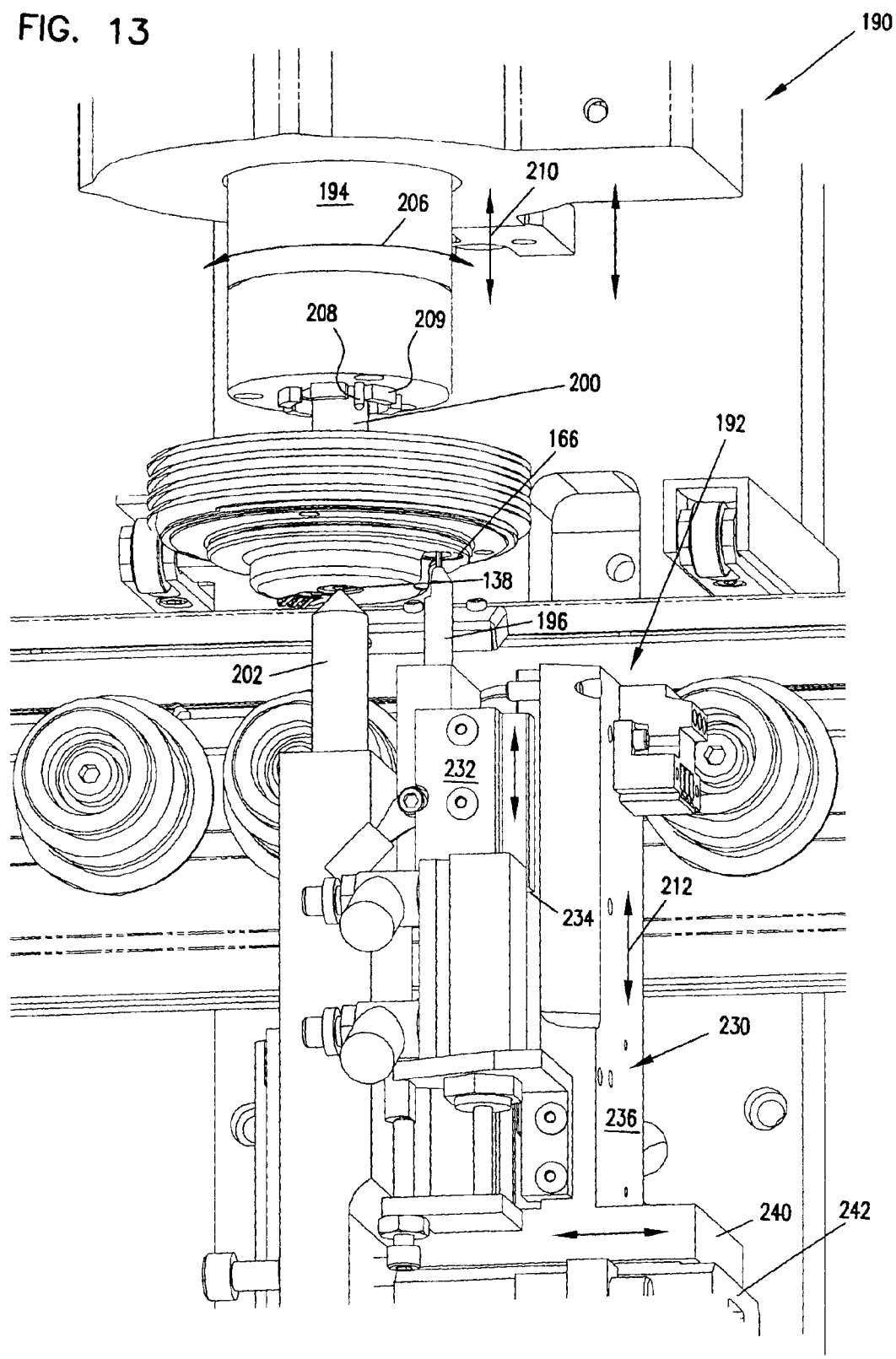
FIG. 13 is a more detailed perspective illustration of the balancing units shown in FIG. 11.

As shown, head 194 is rotationally coupled to the upper balancing unit 190 as illustrated by arrow 206 and includes at least one hub pin 208 sized for insertion into hole 140 (FIG. 6) of the spindle hub 72 as shown in FIG. 13. As shown in FIG. 13,—with drive chassis removed—, the head 194 includes a plurality of hub pins 208 circumferentially spaced for insertion into holes 140 to engage the spindle hub 72 for rotation. Hub blocks 209 are spaced between pins 208 as shown and restrict movement of the head if the pins 208 are not properly aligned with the holes 140. For ring adjustment, head 194 is rotated as illustrated by arrow 206 to rotate the spindle hub while probe 196 engages one of the rings 100, 102 to hold the ring stationary for ring adjustment.

Upper and lower balancing units 190, 192 are movably supported relative to conveyor 180 as illustrated by arrows 210, 212 for operation. As shown in FIG. 10, balancing unit 190 is supported on a shuttle 213 movable along a track 214 coupled to bracket 216. Balancing unit 190 includes a motor assembly 218 which rotates head 194 for balancing operation. Motor assembly 218 is coupled to a controller 220 to rotate head 194 to provide the desired ring balance.

As shown in FIG. 12, lower balancing unit 192 is movably supported on shuttle platform 222 movably supported along a track 224 on stationary block 226 as illustrated by arrow 228 between a raised position and a lowered position. Shuttle platform 222 supports pin 202 and a probe assembly 230. As shown in FIGS. 12–13, probe assembly 230 includes a lift block 232 supporting the probe 196 and movable along lift track 234 on block 236 by a pneumatic lift (or other actuator such as an electric lift) which is operated to raise and lower lift block 232 and probe 192. As shown in FIG. 12, block 236 is supported on slide 240 movable along track 242 to adjust the position of probe 192 to selectively engage the inner or outer ring 100, 102.

Figure 14:
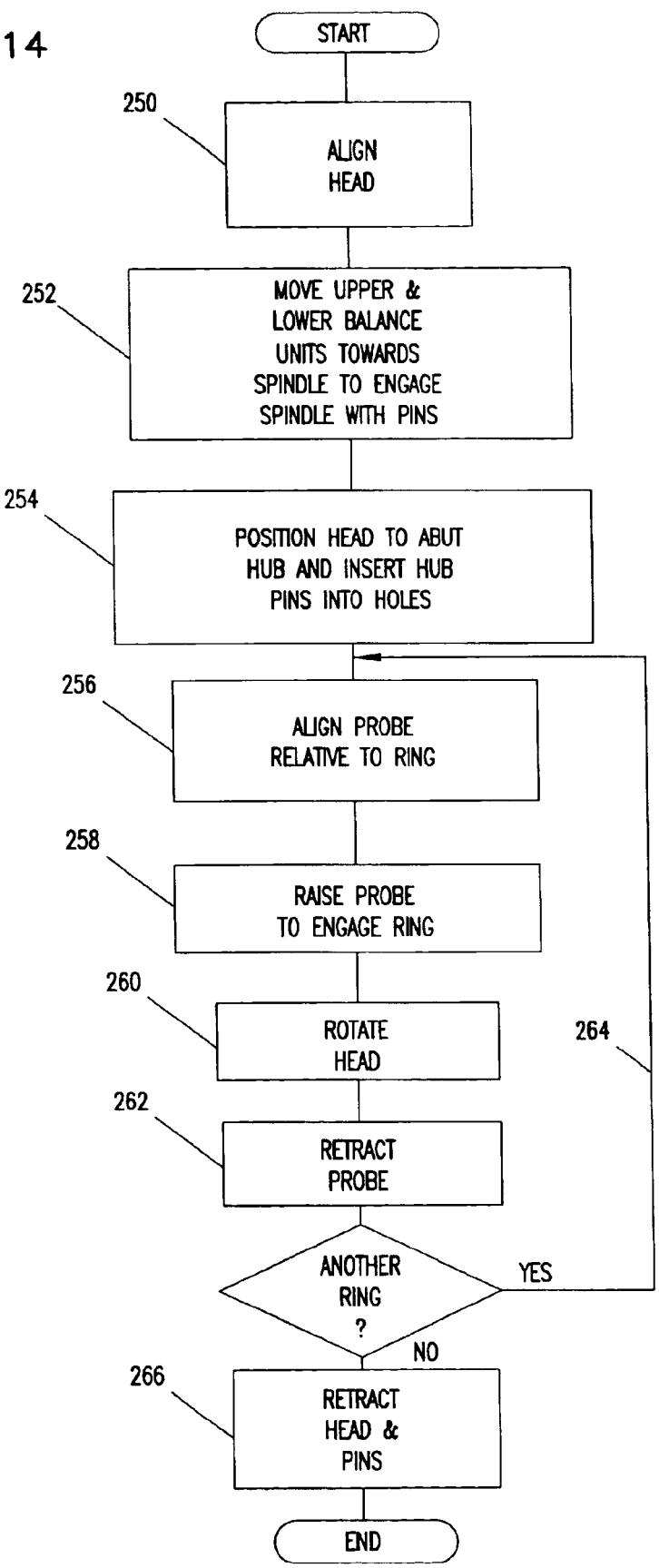
FIG. 14 is a flow chart of an embodiment of a process for dynamically balancing a spindle assembly.

FIG. 14 schematically illustrates an operating sequence for adjusting rings 100, 102 for balancing operations. Upper and lower balancing units 190, 192 are normally supported in a retracted position with the upper unit 190 raised and the lower unit 192 lowered as illustrated in FIG. 11. As shown in block 250, head 194 is rotated to align hub pins 208 with spindle holes 140 based upon feedback from sensor 184. Head 194 is rotated by motor 218 which is operated by controller 220 based upon feedback from sensor 184 as illustrated by line 251 in FIG. 11. Hub blocks 209 limit movement of the head 194 toward the spindle hub if the pins 208 are not aligned with holes 140

As illustrated in block 252, upper and lower balancing units 190, 192 move towards the supported drive. Upper balancing unit 190 is lowered by lowering shuttle 212 along track 214 and lower balancing unit 192 is raised by raising shuttle platform 222 along track 224. The balancing units 190, 192 move towards the spindle so that opposed spindle pins 200, 202 engage opposed ends of the spindle shaft 70. As shown in FIGS. 12–13, the balancing units 190, 192 are lowered and raised, respectively, so that the spindle pins 200, 202 elevate the assembly above conveyor 180. Thereafter, the head 194 is lowered to abut the spindle hub and the hub pins 208 are inserted into spindle holes 140 to engage spindle hub 72 for rotation as illustrated by block 254.

As previously explained, rings 100, 102 are engaged while head 194 is rotated. Probe 196 is aligned with a first ring as illustrated by block 256. Probe 196 is aligned or positioned by adjusting the position of slide 240 along track 242 as shown in FIGS. 12–13. Thereafter, the aligned probe 196 is raised by lift 238 to engage the ring as illustrated by block 258. Head is rotated so that probe 196 engages rings and is rotated to adjust the position of the spindle hub or rotor to perfect the desired ring adjustment as illustrated by block 260. Upon completion, probe 196 is lowered by lift as illustrated by block 262. The process is repeated for each ring as illustrated by line 264. Upon completion of the ring adjustments, balancing units 190, 192 are retracted to retract head 194 and pins 200, 202 as illustrated by block 266.

Figure 15:
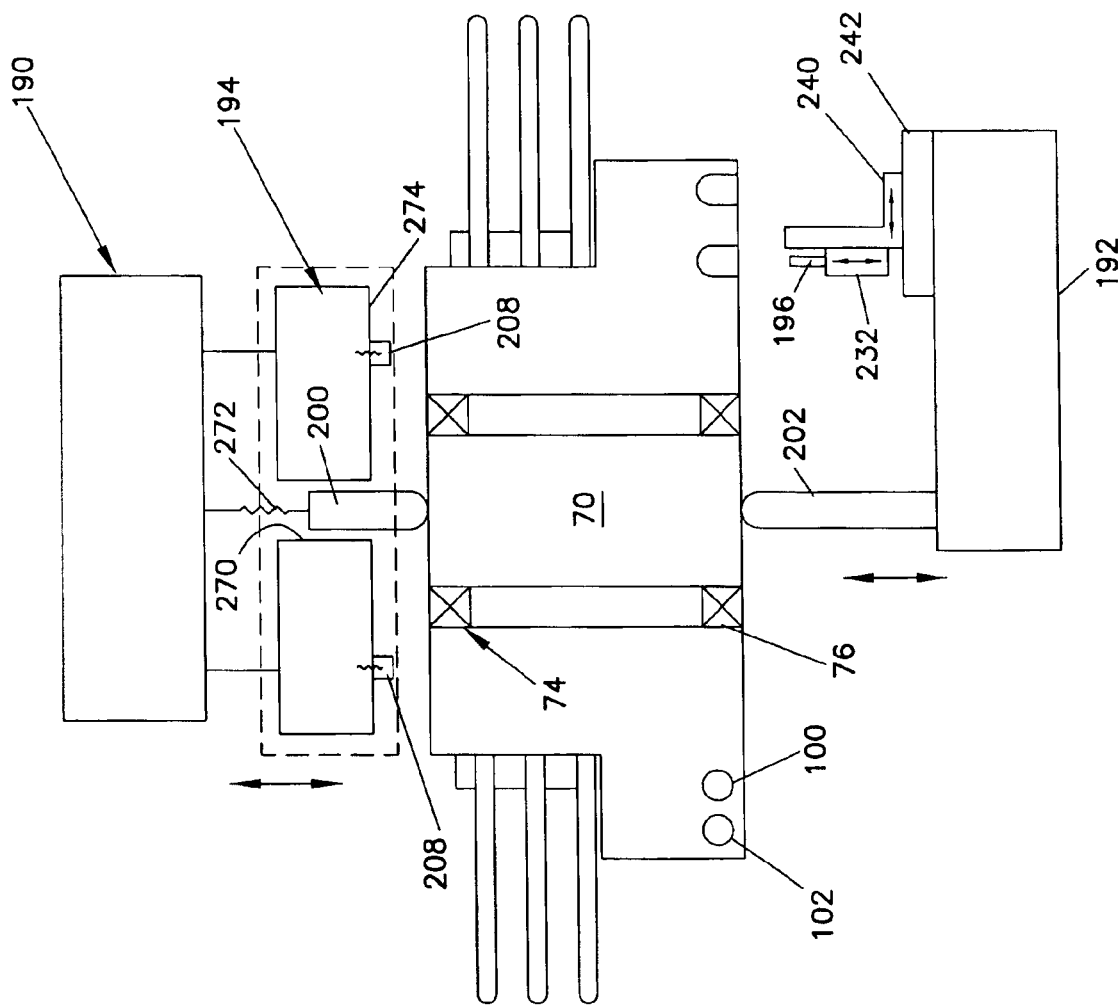
FIGS. 15–16 are schematic figures illustrating an embodiment of the present invention for adjusting eccentric rings using a rotating head and a probe.
Figure 16:
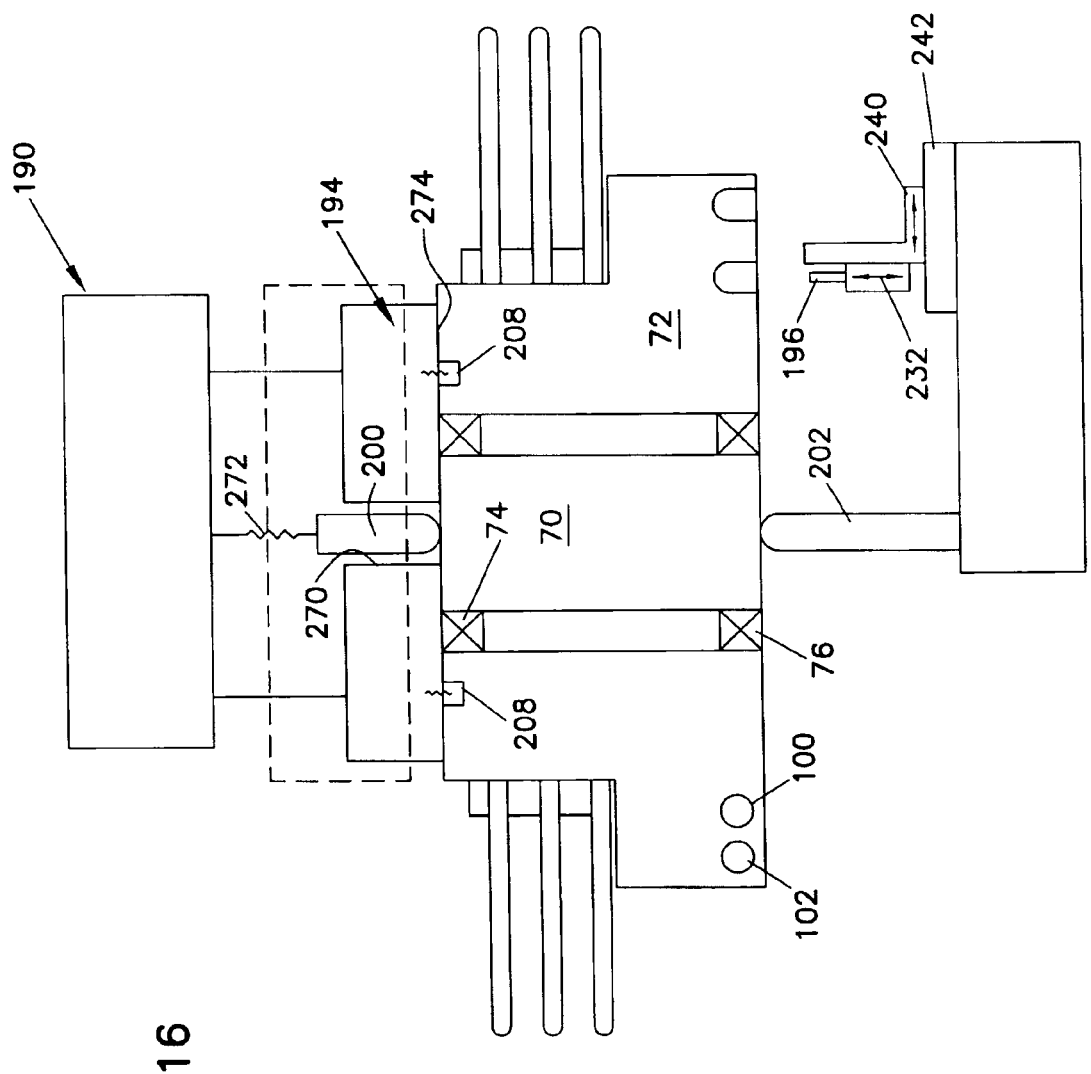

As schematically illustrated in FIG. 15, upper spindle pin 200 slideably extends through channel 270 of head 194 and is spring biased in an extended position relative to head 194 (as shown in FIG. 13) as schematically illustrated at 272. As previously described, shuttles 213, 222 move balancing units 190, 192 so that pins engage shaft 70 and the assembly is raised from the conveyor 180. Continued movement of balancing units 190, 192 compresses pin 200 against the spring bias so that pin retracts relative to face 274 of head 194 so that head 194 abuts spindle hub 72 and hub pins 208 insert into holes 140 of the spindle hub as illustrated schematically in FIG. 15. In the embodiment shown, hub pins 208 are spring biased in an extended position for insertion into holes 140. Thereafter head 194 rotates while probe 196 engages rings 100, 102 as previously described.

As previously described, the rings are adjusted to compensate for a measured imbalance of the spindle assembly. The head 194 is programmed or controlled to rotate a specific degree to compensate for the measured imbalance. Operation of the head 194 can be controlled based upon a measured imbalance which is recorded on an identification tag of the disc drive, and which is read from the tag for balancing adjustments. In the embodiment shown, the measured imbalance is read from the tag as the disc drive is conveyed along the conveyor 180 and is downloaded to a controller to operate the head motor 218.

A spindle assembly including a spindle hub or rotor 72 rotatable about a spindle shaft 70. The spindle hub or rotor 72 including radially concentric channels 148, 150 having eccentric rings 100, 102 adjustably supported therein to dynamically balancing the spindle assembly. A balancing system to dynamically balance the spindle assembly based upon a measured imbalance of the spindle assembly and eccentric rings 100, 102.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a spindle assembly for a magnetic disc drive system, it will be appreciated by those skilled in the art that the teachings of the present invention can be applied to other systems, such as optical drive systems, without departing from the scope and spirit of the present invention.

What is claimed is:

1. A method for balancing a spindle assembly comprising steps of:
   providing the spindle assembly having a spindle rotationally coupled to a spindle portion and including adjustable eccentric ring;
   measuring an imbalance of a combination of the spindle assembly and the eccentric rings preassembled with the spindle assembly; and
   dynamically balancing the spindle assembly by adjusting the eccentric rings based upon the measured imbalance of the combination of the spindle assembly and the eccentric rings.

2. The method of claim 1 wherein the imbalance of the spindle assembly and the eccentric rings is measured with the rings in a dynamically balanced position.

3. The method of claim 1, wherein the step of adjusting the eccentric rings comprises the step of:
   rotating the spindle while engaging one of the eccentric rings to adjust alignment of the one of the eccentric rings to dynamically balance the spindle assembly.

4. The method of claim 3 wherein the spindle is rotated by a head having at least one head pin adapted for insertion into a bore of the spindle and comprising steps of:
   inserting the at least one head pin into the bore of the spindle to engage the spindle; and
   rotating the head to rotate the spindle.

5. The method of claim 4 and further comprising the step of:
   measuring alignment of the spindle;
   rotating the head prior to inserting the at least one head pin into the bore of the spindle to align the at least one head pin relative to the bore of the spindle.

6. The method of claim 3 wherein the spindle assembly is coupled to a mounting plate connected to a drive chassis and the step of engaging the one of the eccentric rings comprises:
   inserting a probe through an opening in the mounting plate to engage the one of the eccentric rings.

7. The method of claim 1 wherein the step of adjusting the eccentric rings comprises steps of:
   aligning a probe relative to a first eccentric ring and engaging the first eccentric ring;
   rotating the spindle to adjust the first eccentric ring;
   withdrawing the probe from the first eccentric ring;
   aligning the probe relative to a second eccentric ring and engaging the second eccentric ring; and
   rotating the spindle to adjust the second eccentric ring.

8. The method of claim 4 and further comprising the step of:
   inserting opposed spindle pins into openings on opposed ends of the spindle portion to support the spindle assembly for balancing.

9. The method of claim 1 wherein the measured imbalance is recorded on a device tag and further comprising the step of:
   downloading the measured imbalance to a controller to adjust the eccentric rings based upon the measured imbalance.

10. The method of claim 8 wherein one of said spindle pins extends through a channel of the head and is biased in an extended position and comprising the step of:
    retracting the spindle pin in the channel of the head against the bias to engage the head with the spindle for rotation.

11. The method of claim 6, wherein the probe is supported on a lift coupled to an axial slide and comprising steps of:
    operating the slide to move the probe to selectively align with first and second eccentric rings; and
    operating the lift to raise the probe to engage the first and second rings and lower the probe to disengage the first and second rings.

12. A method for balancing a spindle assembly comprising steps of:
    providing a spindle assembly having a spindle rotationally coupled to a spindle portion and including adjustable eccentric rings pre-assembled with the spindle assembly; and
    dynamically balancing the spindle assembly by adjusting the eccentric rings based upon a measured imbalance of a combined structure of the spindle assembly and the eccentric rings.

* * * * *